(12) United States Patent
Nagai et al.

(10) Patent No.: US 6,446,520 B1
(45) Date of Patent: Sep. 10, 2002

(54) FEED SCREW AND METHOD OF MANUFACTURING THE SAME

(75) Inventors: Shigekazu Nagai, Tokyo; Hiroyuki Shiomi, Ibaraki-ken, both of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/581,531

(22) PCT Filed: Dec. 24, 1998

(86) PCT No.: PCT/JP98/05881
§ 371 (c)(1), (2), (4) Date: Jul. 7, 2000

(87) PCT Pub. No.: WO99/35419
PCT Pub. Date: Jul. 15, 1999

(30) Foreign Application Priority Data

Jan. 7, 1998 (JP) .................... 10-001781

(51) Int. Cl.$^7$ .................... F16H 25/24; F16H 25/22; B21H 3/00
(52) U.S. Cl. .................... 74/89.33; 74/89.44; 74/424.82; 205/213; 205/222; 384/492; 384/625; 408/1 R; 470/10; 470/25
(58) Field of Search .................... 74/89.33, 89.44, 74/424.82; 205/213, 222; 408/1 R; 470/10, 25; 384/492, 625, 908, 912, 913

(56) References Cited

U.S. PATENT DOCUMENTS

| | | | | |
|---|---|---|---|---|
| 4,372,223 A | * | 2/1983 | Iwatani | 108/143 |
| 4,627,411 A | * | 12/1986 | Mertler | 126/39 E |
| 4,861,290 A | * | 8/1989 | Halmstad et al. | 439/810 |
| 5,074,160 A | * | 12/1991 | Kasuga | 74/89.33 |
| 5,240,590 A | * | 8/1993 | Brar et al. | 205/208 |
| 5,325,732 A | * | 7/1994 | Vogel | 74/89.44 |
| 5,361,024 A | * | 11/1994 | Wisner et al. | 361/23 X |
| 5,492,030 A | * | 2/1996 | Benton et al. | 74/441 |
| 5,959,828 A | * | 9/1999 | Lewis et al. | 361/215 |
| 6,012,882 A | * | 1/2000 | Turchan | 409/74 |

FOREIGN PATENT DOCUMENTS

| | | |
|---|---|---|
| JP | 48-263 | 1/1973 |
| JP | 63-182351 | 11/1988 |
| JP | 4-203549 | 7/1992 |
| JP | 6-305212 | 11/1994 |
| JP | 7-110057 | 4/1995 |
| JP | 8-285030 | 11/1996 |

* cited by examiner

Primary Examiner—Allan D. Herrmann
(74) Attorney, Agent, or Firm—Oblon, Spivak, McClelland, Maier & Neustadt, P.C.

(57) ABSTRACT

A ball screw 2 or a sliding screw 2a has a driving force-transmitting shaft 4 or 4a and a bearing member 6 or 6a externally fitted to the driving force-transmitting shaft 4 or 4a. The driving force-transmitting shaft 4 or 4a is made of aluminum or aluminum alloy, and the bearing member 6 or 6a is made of any one of synthetic resin, aluminum, and aluminum alloy. The member, which is formed by using the aluminum or the aluminum alloy, is applied with a surface treatment, and preferably, it is further applied with a surface finish treatment.

16 Claims, 6 Drawing Sheets

FEED SCREW AND METHOD OF MANUFACTURING THE SAME

BACKGROUND OF THE INVENTION

1. Field of the Invention

The present invention relates to a feed screw and a method for producing the same. In particular, the present invention relates to a feed screw which is used, for example, as a means for transmitting driving force for an actuator for transporting a workpiece by transmitting the driving force of a driving source to a movable member via a driving force-transmitting means to displace the movable member in a predetermined direction, and a method for producing the same.

2. Discussion of the Background

Various actuators have been hitherto used to transport the workpiece. Such an actuator has a movable member which is displaceable in the longitudinal direction of a frame for constructing an outer frame, and a feed screw such as a ball screw or a sliding screw which is coaxially coupled to a motor shaft. When the rotary driving force of a motor is transmitted via the feed screw to the movable member, the movable member is displaced linearly. The workpiece, which is placed on the movable member, is transported in accordance with the displacement of the movable member as described above.

Those ordinarily used as the feed screw are able to maintain the sliding performance in a well-suited manner, including, for example, those made of metal such as carbon steel and stainless materials, and those made of synthetic resin such as polyacetal.

However, the feed screw, which is composed of carbon steel or stainless material, involves such an inconvenience that the attachment operation is difficult, because the feed screw has a relatively heavy weight. Further, the feed screw of this type affects the magnetic field, for example, in such a way that the magnetic flux density is changed. Therefore, the feed screw of this type involves such an inconvenience that the attachment place is restricted.

On the other hand, the feed screw, which is made of synthetic resin such as polyacetal, causes the following problem. That is, any abrasion occurs at the sliding portion of the feed screw due to the use for a long period of time. As a result, the rotary driving force of the motor is not successfully transmitted to the movable member.

In order to avoid the abrasion as described above, it is preferable to apply lubricating oil such as grease to the sliding portion of the feed screw. However, the following inconvenience arises. That is, it is impossible to use any lubricating oil in an environment in which the cleanness is required so that the contamination of dust is avoided as strictly as possible, for example, in a clean room for the equipment for producing semiconductors.

SUMMARY OF THE INVENTION

The present invention has been made in order to solve the problems described above, an object of which is to provide a feed screw and a method for producing the same which make it possible to reduce the abrasion of respective members and the frictional resistance at the sliding portion wherein the weight of the feed screw is reduced to facilitate the attachment operation, and there is no limitation for the attachment place.

According to the present invention, there is provided a feed screw comprising a driving force-transmitting shaft and a bearing member externally fitted to the driving force-transmitting shaft, wherein the driving force-transmitting shaft is preferably made of aluminum or aluminum alloy, and the bearing member is preferably made of any one of synthetic resin, aluminum, or aluminum alloy.

In the present invention, preferred examples of the synthetic resin include, for example, polyacetal and super high molecular weight polyethylene.

Accordingly, the abrasion of the driving force-transmitting shaft and the bearing member for constructing the feed screw is decreased, and the sliding resistance at the sliding portions of the both is decreased. Thus, the frictional resistance is reduced. The weight of the feed screw can be also decreased, and hence it is easy to perform the attachment operation for the actuator or the like provided with the feed screw. Further, it is possible to allow the driving force-transmitting shaft to have a lengthy size. The input torque is increased owing to the large load inertia. Therefore, it is possible to realize a compact size of a motor as a driving source. Further, the influence exerted on the magnetic field is suppressed, and hence the attachment place is not limited.

In the feed screw according to the present invention, it is preferable that a nickel coating film is formed on a surface of the member made of aluminum or aluminum alloy by means of a plating treatment including an electroless nickel plating treatment. It is preferable that a thermal hardening treatment is further applied to the layer having been subjected to the plating treatment. Alternatively, it is also preferable that the surface of the member made of aluminum or aluminum alloy is surface-treated by means of an aluminum anodic oxidation treatment or a magnesium anodic oxidation treatment.

The hardness and the smoothness of the surface of the member made of aluminum or aluminum alloy are enhanced by means of the treatment as described above. It is possible to further reduce the abrasion of the respective members and the frictional resistance of the sliding portions. Especially, when the member, which is surface-treated by means of the anodic oxidation treatment, is subjected to the thermal hardening treatment, it is possible to obtain such an effect that the stress is relaxed for the anodic oxidation-treated layer and the base metal layer made of aluminum or aluminum alloy. The anodic oxidation treatment may be a colored anodic oxidation treatment. Further, a sealing treatment, which is performed in a slight degree as compared with ordinary cases, may be applied to the layer having been subjected to the anodic oxidation.

It is also preferable that a surface of the member made of aluminum or aluminum alloy is surface-treated by means of a shot peening treatment applied a plurality of times by alternately using two types of particles having different particle sizes. The shot peening treatment may be also applied to the member which has been surface-treated by means of the plating treatment or the anodic oxidation treatment. The shot peening treatment makes it possible to obtain an excellent feed screw in which the surface roughness and the residual stress are reduced.

When the shot peening treatment is applied a plurality of times by alternately using the two types of particles having the different particle sizes, the particles having the large particle size are firstly used to harden the surface. Subsequently, the particles having the small particle size are used to form fine irregularities on the surface. The irregularities function as oil reservoirs as described later on.

In this case, it is preferable to apply, between the respective shot peening treatments, a surface finish treatment such as a liquid honing finish treatment, a lapping finish treatment, and a sandblast finish treatment.

The following method is preferably used as a method for reducing the surface roughness and the residual stress by means of the plurality of times of the shot peening treatments. That is, the size of the shot peening particle, which resides in the relatively large particle and which is optimum for the aluminum or the aluminum alloy as the material to be processed, is experimentally determined and programmed beforehand. The shot peening treatment is performed under the obtained condition. Subsequently, the shot peening treatment is performed by changing the shot peening condition including the particle size, in a stepwise manner ranging from the surface to the inside of a workpiece. It is desirable that these processing operations are automated.

The stepwise shot peening treatment as described above may be performed once, twice, or more, for example, before the processing treatment for plating the feed screw. When the sandblast finish treatment, the buff finish treatment, or the liquid honing finish treatment is performed before, during, or after the stepwise shot peening treatment, it is possible to remove fine burrs on the workpiece surface, which is preferred.

In the method for effecting the surface treatment or the surface finish treatment by means of the shot peening treatment, it is preferable to form the inclined surface or the oil reservoir having the elastohydrodynamic lubrication effect on the surface of the feed screw. Therefore, when the shot peening treatment is performed, it is preferable to use particles having a ball-shaped configuration or a polyhedral configuration with a size which makes it possible to form the inclined surface or the oil reservoir having a desired size.

When the portion, which is located in the vicinity of the surface of the member, is recrystallized or hardened by means of the shot peening treatment, or when the portion is thermally hardened by means of the partial heat generation, then it is possible to allow the surface of the member to have a higher hardness. When the shot peening treatment is performed, the metal, which is contained in the particles used for the shot peening, penetrates into the surface of the member. Therefore, it is also possible to obtain an effect to improve the quality of the surface owing to the permeation of the metal.

It is preferable that the member, which is surface-treated by means of the plating treatment, the aluminum anodic oxidation treatment, the magnesium anodic oxidation treatment, or the shot peening treatment, is subjected to a surface finish treatment by means of at least one method selected from the group consisting of a super finishing treatment, a buff finish treatment, a lapping finish treatment, a liquid honing finish treatment, a burnishing finish treatment, a roller finish treatment, a chemical polishing finish treatment, an electropolishing finish treatment, a sandblast finish treatment, a grinding finish treatment with a diamond grinding wheel or a boron nitride grinding wheel, a grinding finish treatment with a diamond grinding wheel or a boron nitride grinding wheel equipped with a dressing mechanism, and a cutting finish treatment with a diamond electrodeposition tap or a broach tap. Accordingly, for example, the smoothness of the surface of the member can be further improved.

According to the present invention, there is provided a to method for producing a feed screw, wherein at least any one of a driving force-transmitting shaft and a bearing member is preferably manufactured from aluminum or aluminum alloy by means of a rolling method. That is, a cold process or a hot process is performed while rotating the aluminum or the aluminum alloy, and pressing a die against the aluminum or the aluminum alloy to form at least any one of the driving force-transmitting shaft and the bearing member.

Accordingly, it is possible to efficiently produce the feed screw having a high machining accuracy.

According to the present invention, there is also provided a method for producing a feed screw, wherein at least any one of a driving force-transmitting shaft and a bearing member is preferably manufactured from aluminum or aluminum alloy by means of a precision cutting method based on the use of any one selected from the group consisting of a diamond tip, a boron nitride tip, an electrodeposition tool made of diamond, a sintering tool made of diamond, an electrodeposition tool made of boron nitride, and a sintering tool made of boron nitride.

Accordingly, it is possible to further reduce the abrasion between the driving force-transmitting shaft and the bearing member and the sliding resistance at the sliding portions of the both.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The feed screw according to the present invention will be exemplified by preferred embodiments as related to its production method, which will be explained in detail below with reference to the accompanying drawings.

Figure 1:
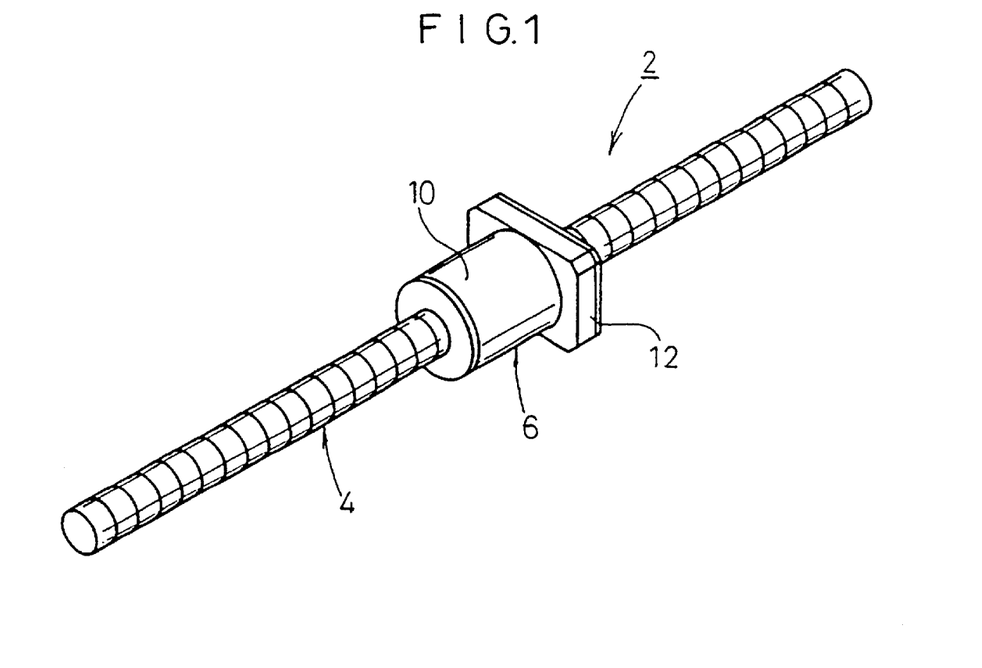
FIG. 1 shows, with partial omission, a perspective view illustrating a ball screw according to a first embodiment of the present invention.
Figure 2:
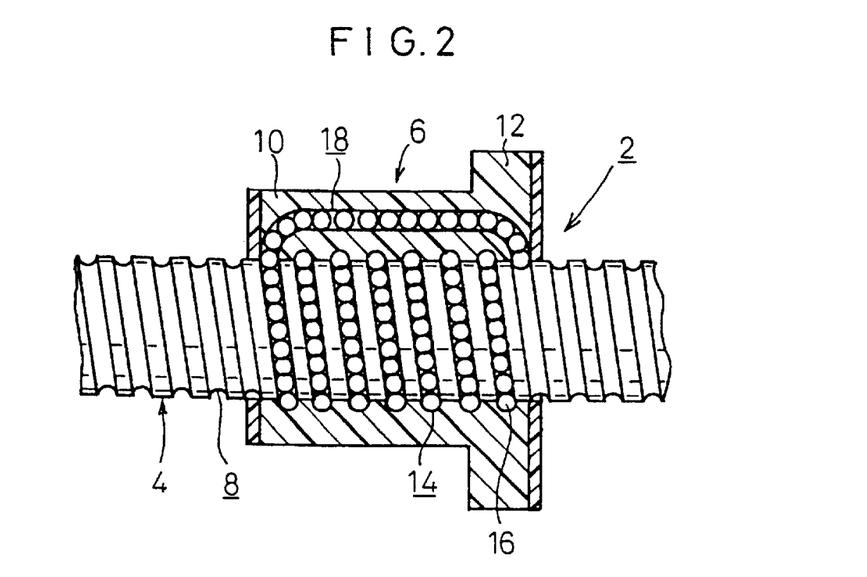
FIG. 2 shows a partial longitudinal sectional view taken along an axial direction, illustrating the ball screw shown in FIG. 1.

A ball screw 2, which is a feed screw according to a first embodiment of the present invention shown in FIGS. 1 and 2, comprises a driving force-transmitting shaft 4 and a bearing member 6 which is externally fitted to the driving force-transmitting shaft 4. The driving force-transmitting shaft 4 is made of aluminum or aluminum alloy. The bearing member 6 is made of a polyethylene resin material having a super high molecular weight.

A helically circumscribing groove 8 is formed on the outer circumference of the driving force-transmitting shaft 4 made of aluminum. The bearing member 6 is fitted to the driving force-transmitting shaft 4.

The bearing member 6 has a columnar section 10 and a flange section 12 which is formed integrally with the columnar section 10. The bearing member 6 is formed with a helical groove 14 corresponding to the groove 8. A track for allowing a plurality of balls 16 to roll therethrough, is formed by the groove 8 and the groove 14. In FIG. 2, reference numeral 18 indicates a passage for transporting the balls 16 from one end to the other end of the columnar section 10 of the bearing member 6. An endless circulating track, in which the balls 16 roll, is constructed by the track and the passage 18 communicating with each other.

Figure 3:
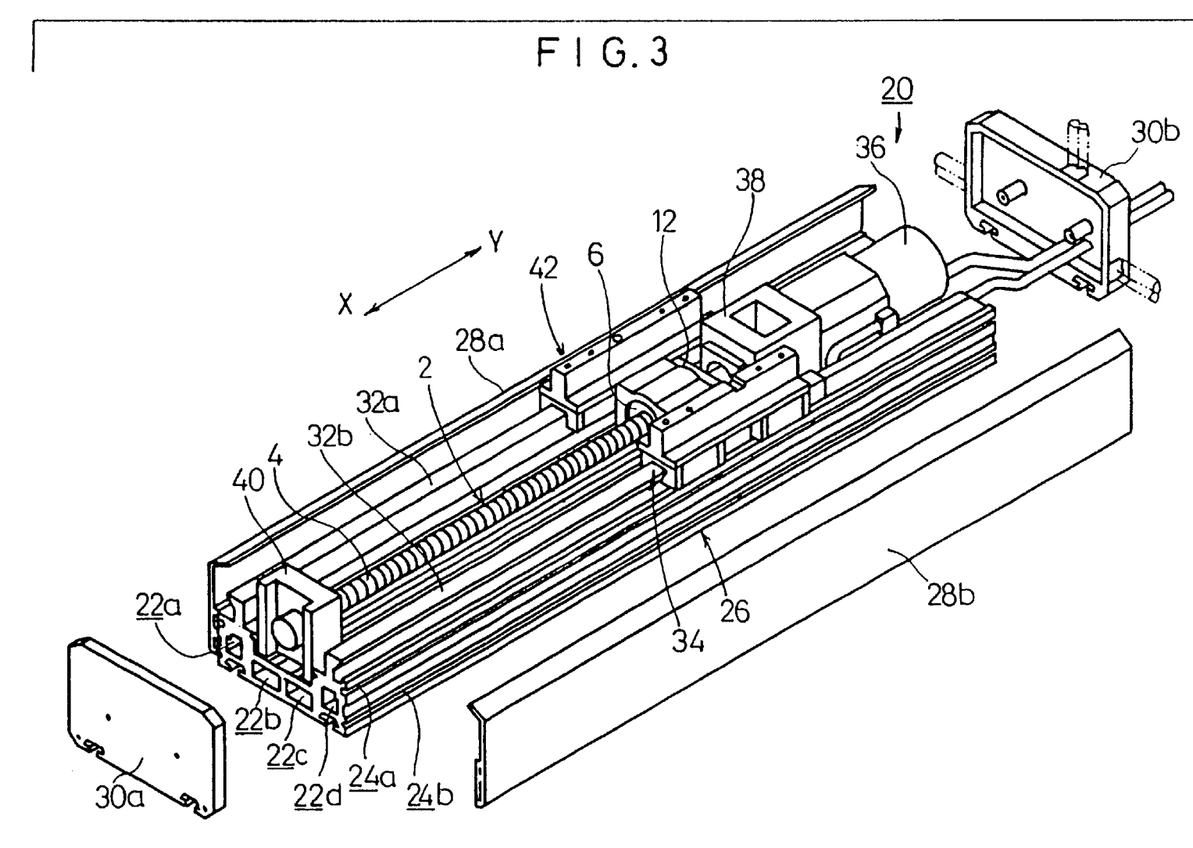
FIG. 3 shows an exploded perspective view illustrating an actuator equipped with the ball screw shown in FIG. 1.

FIG. 3 shows an actuator 20 in which the ball screw 2 constructed as described above is applied, for example, as a driving force-transmitting means for transmitting the rotary driving force of a rotary driving source to a movable member.

The actuator 20 comprises a frame 26 which has grooves 24a, 24b and a plurality of fluid passages 22a to 22d penetrating therethrough in the longitudinal direction, a pair of side covers 28a, 28b which are provided detachably on both side surfaces of the frame 26 by the aid of the grooves 24a, 24b, and end covers 30a, 30b which are installed to both ends of the frame 26 in the longitudinal direction respectively. An unillustrated top cover is supported over the frame 26 by the aid of the end covers 30a, 30b.

A guide mechanism 34, which includes a pair of guide rails 32a, 32b provided integrally with the frame 26 in the longitudinal direction, is provided on the top surface of the frame 26. A motor 36 is fixedly provided between the guide rails 32a, 32b. An unillustrated coupling member, which is arranged in a block member 38, transmits the rotary driving force of the motor 36 to the ball screw 2. The driving force-transmitting shaft 4 of the ball screw 2 is rotatably supported by a support block 40 at its one end.

A movable member 42, which has a holding section for holding the bearing member 6 and which is displaceable integrally with the bearing member 6 in accordance with the guiding action of the guide rails 32a, 32b, is provided in the frame 26.

Figure 4:
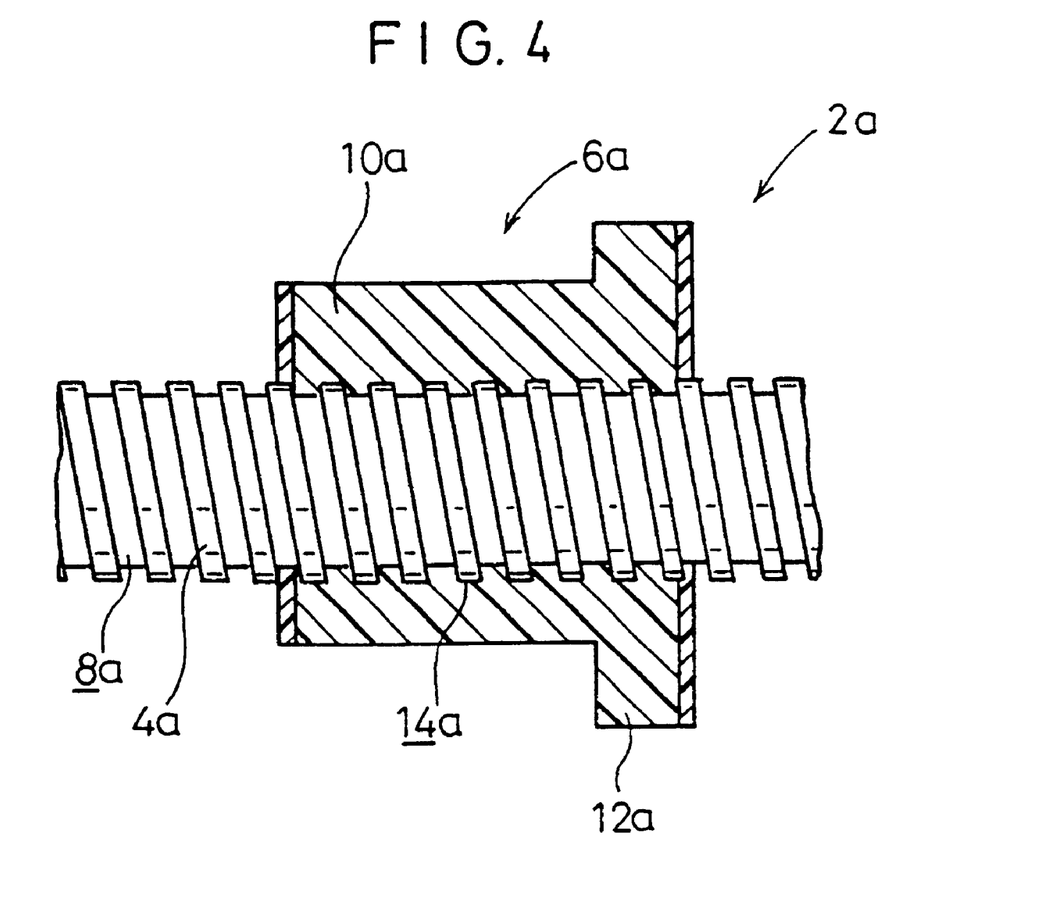
FIG. 4 shows a partial longitudinal sectional view taken along an axial direction, illustrating a sliding screw according to a second embodiment of the present invention.

Next, FIG. 4 shows a sliding screw 2a which is a feed screw according to a second embodiment of the present invention.

The sliding screw 2a has a driving force-transmitting shaft 4a which is made of aluminum or aluminum alloy for transmitting the rotary driving force from an unillustrated driving source. A bearing member 6a, which is engaged with the driving force-transmitting shaft 4a, is made of polyacetal resin. In FIG. 4, reference numeral 8a indicates one stripe of helical groove, reference numeral 10a indicates a columnar section, and reference numeral 12a indicates a flange section. Reference numeral 14a indicates one stripe of helical groove which is formed on the bearing member 6a.

According to the ball screw 2 and the sliding screw 2a as the feed screws concerning the first and second embodiments, the driving force-transmitting shaft 4, 4a is made of the aluminum or the aluminum alloy, and the bearing member 6, 6a is made of the synthetic resin material.

Therefore, it is possible to reduce the frictional resistance at the sliding portions between the driving force-transmitting shaft 4, 4a and the bearing member 6, 6a, and it is possible to realize a light weight.

Each of the driving force-transmitting shaft 4, 4a and the bearing member 6, 6a may be made of aluminum or aluminum alloy. Further, not only the feed screw but also the entire actuator 20 including, for example, the support block 40, the movable member 42, and the guide mechanism 34 may be made of aluminum or aluminum alloy.

The mechanical apparatus, which is equipped with the actuator 20, may be made of aluminum or aluminum alloy. This construction may be also applied to another main actuator body and a connecting member (not shown) to unillustrated another actuator which is operated in an integrated manner by being combined with the feed screw of the actuator 20 at the right angle or an arbitrary angle. Those usable as a method for integrally forming, for example, the actuator and the connecting member include various methods such as molding, extrusion, drawing, and forging. The actuator constructed as described above is also preferably usable for the apparatus for producing semiconductors.

Figure 5:
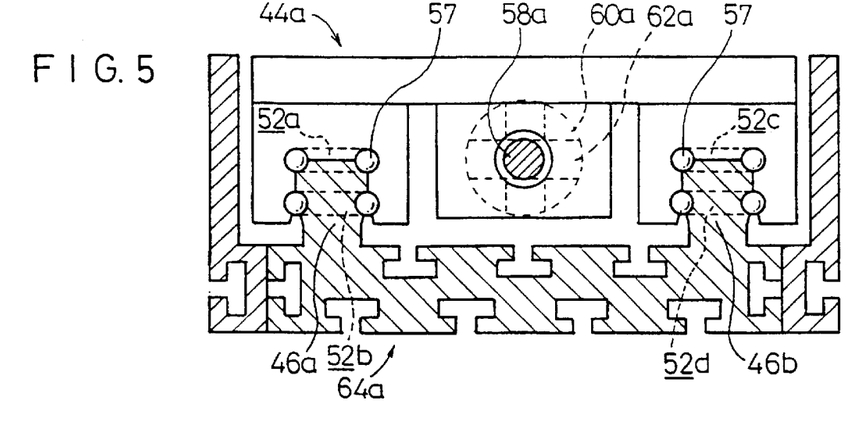
FIG. 5 shows a partial vertical sectional view illustrating a guide mechanism and a frame of an actuator in which entire portions of respective members are made of aluminum or aluminum alloy.
Figure 6:
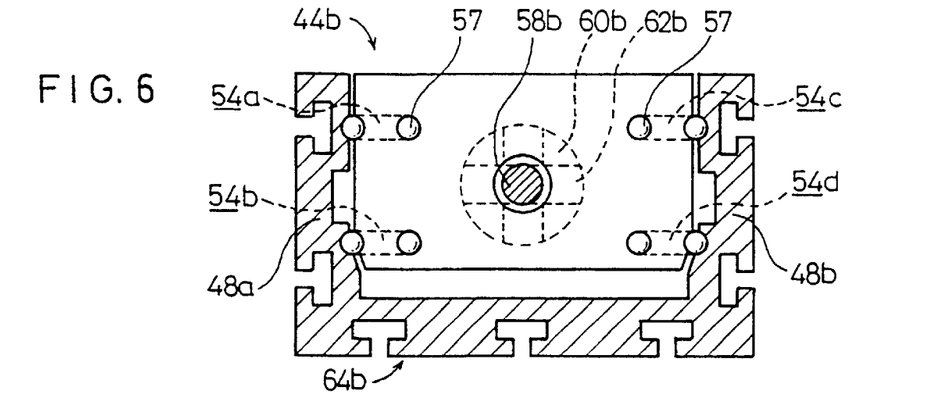
FIG. 6 shows a partial vertical sectional view illustrating a guide mechanism and a frame of another example concerning the actuator shown in FIG. 5.
Figure 7:
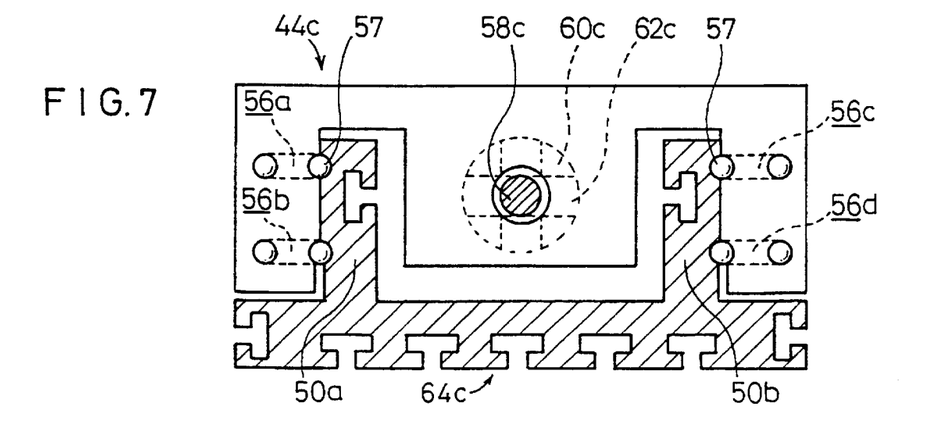
FIG. 7 shows a partial vertical sectional view illustrating a guide mechanism and a frame of still another example concerning the actuator shown in FIG. 5.

FIGS. 5 to 7 show examples in which the entire actuator is made of aluminum or aluminum alloy. FIGS. 5 to 7 show partial cross-sectional views each of which illustrates an actuator depicting a guide mechanism fixedly provided with a motor and a feed screw and a frame section for receiving the guide mechanism. However, each of the structures is different from that of the actuator 20 shown in FIG. 3.

That is, the actuator 20 shown in FIG. 3 is constructed such that the guide mechanism 34 slides on the guide rails 32a, 32b. However, in the case of the actuators shown in FIGS. 5 to 7, balls 57 are installed to circumscribing grooves 52a to 52d, 54a to 54d, 56a to 56d, which are formed at respective four positions between the guide mechanism 44a to 44c and the guide rails 46a, 46b, 48a, 48b, 50a, 50b. The guide mechanisms 44a to 44c are moved on the guide rails 46a, 46b, 48a, 48b, 50a, 50b by the aid of the balls 57 which roll in the circumscribing grooves 52a to 52d, 54a to 54d, 56a to 56d. In relation to this arrangement, the feed screw 58a to 58c and the motor 60a to 60c are connected to one another by the aid of an Oldham's coupling 62a to 62c so that the stable driving operation is successfully performed even when the centering is displaced to some extent at the direct coupling portion between the feed screw 58a to 58c and the motor 60a to 60c.

The actuators shown in FIGS. 5 to 7 are different in structure from each other.

At first, in the actuator shown in FIG. 5, a frame 64a has a three-divided structure, and its components are mutually fastened by screws. The guide rails 46a, 46b are formed to expand upwardly on both end sides of the centrally disposed frame section of the three-divided frame 64a. The guide mechanism 44a, which has grooves having a recessed configuration formed downwardly, is supported while being fitted to the guide rails 46a, 46b. The feed screw 58 and the motor 60a are arranged at central portions of the guide mechanism 44a.

In the actuator shown in FIG. 6, the feed screw 58b and the motor 60b are provided at central portions of the guide mechanism 44b which is formed to have a rectangular configuration. The guide mechanism 44b has such a structure that it is surrounded by an integrated type frame 64b in three directions except for the top. The guide mechanism 44b is supported by the guide rails 48a, 48b by the aid of the balls 57 which roll through the circumscribing grooves 54a to 54d of the guide rails 48a, 48b provided at the side surfaces.

FIG. 7 shows a modified embodiment of the actuator shown in FIG. 5. That is, a frame 64c of this actuator does not have the frame sections at the both ends.

Figure 8:
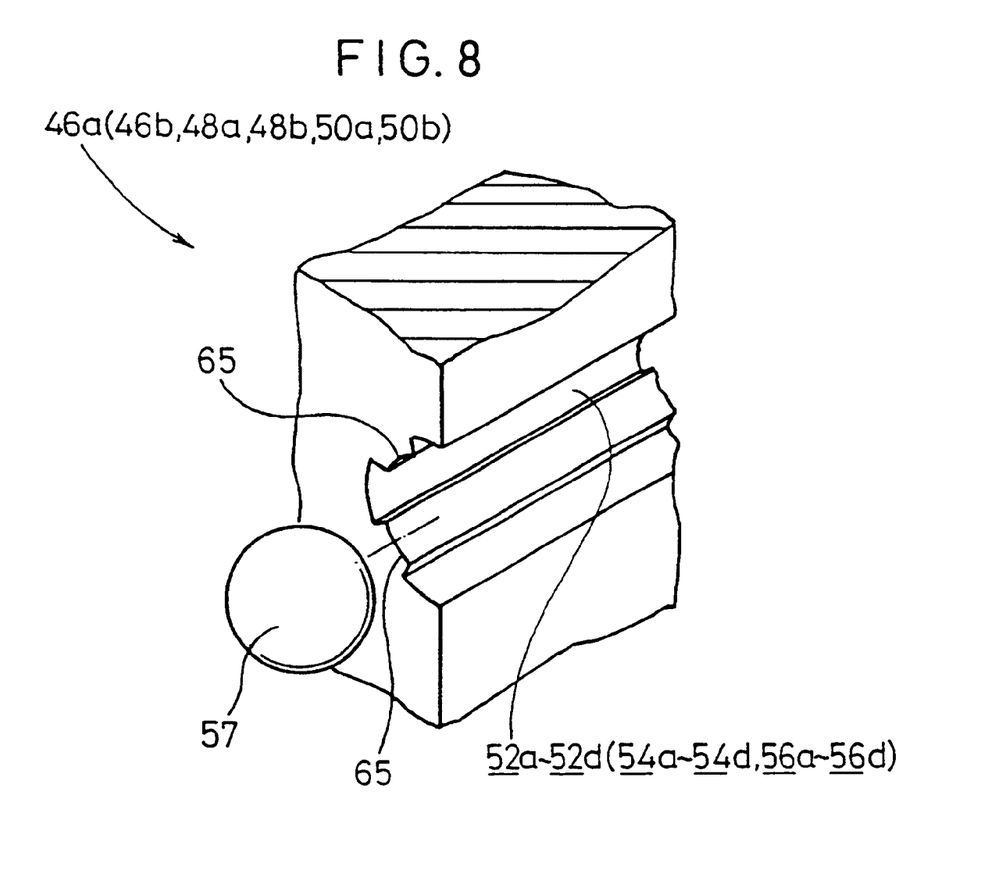
FIG. 8 shows, with partial cutout, a perspective view illustrating a circumscribing groove of a guide rail provided for the actuator shown in FIGS. 5 to 7.

In the embodiments described above, as shown in FIG. 8, when the cross-sectional configuration of the circumscribing grooves 52a to 52d, 54a to 54d, 56a to 56d of the guide rails 46a, 46b, 48a, 48b, 50a, 50b are formed to have a shape of a Gothic arch 65, the abrasion resistance is reduced more successfully at the sliding portion with respect to the balls 57.

When the respective members of the driving force-transmitting shaft and the bearing member of the feed screw according to the first or second embodiment are made of aluminum or aluminum alloy, the rolling method can be adopted as one of production methods.

That is, a cold process or a hot process is performed while rotating the aluminum or the aluminum alloy, and pressing a die against the aluminum or the aluminum alloy to form the member.

Other preferred production methods include a precision cutting method based on the use of, for example, a diamond tip, a boron nitride tip, an electrodeposition tool made of diamond, a sintering tool made of diamond, an electrodeposition tool made of boron nitride, or a sintering tool made of boron nitride.

In this case, the feed screw can be cut by means of super high speed cutting at a number of revolutions of 10000 to 30000 rpm. Alternatively, in place of these methods, at least one of the driving force-transmitting shaft and the bearing member of the feed screw is cut with a general-purpose tip cutting tool, and the bearing member is cut with a cutting tool of any one of a tap and a broach tap. Thus, it is possible to conveniently produce the feed screw having a desired surface nature.

Figure 9:
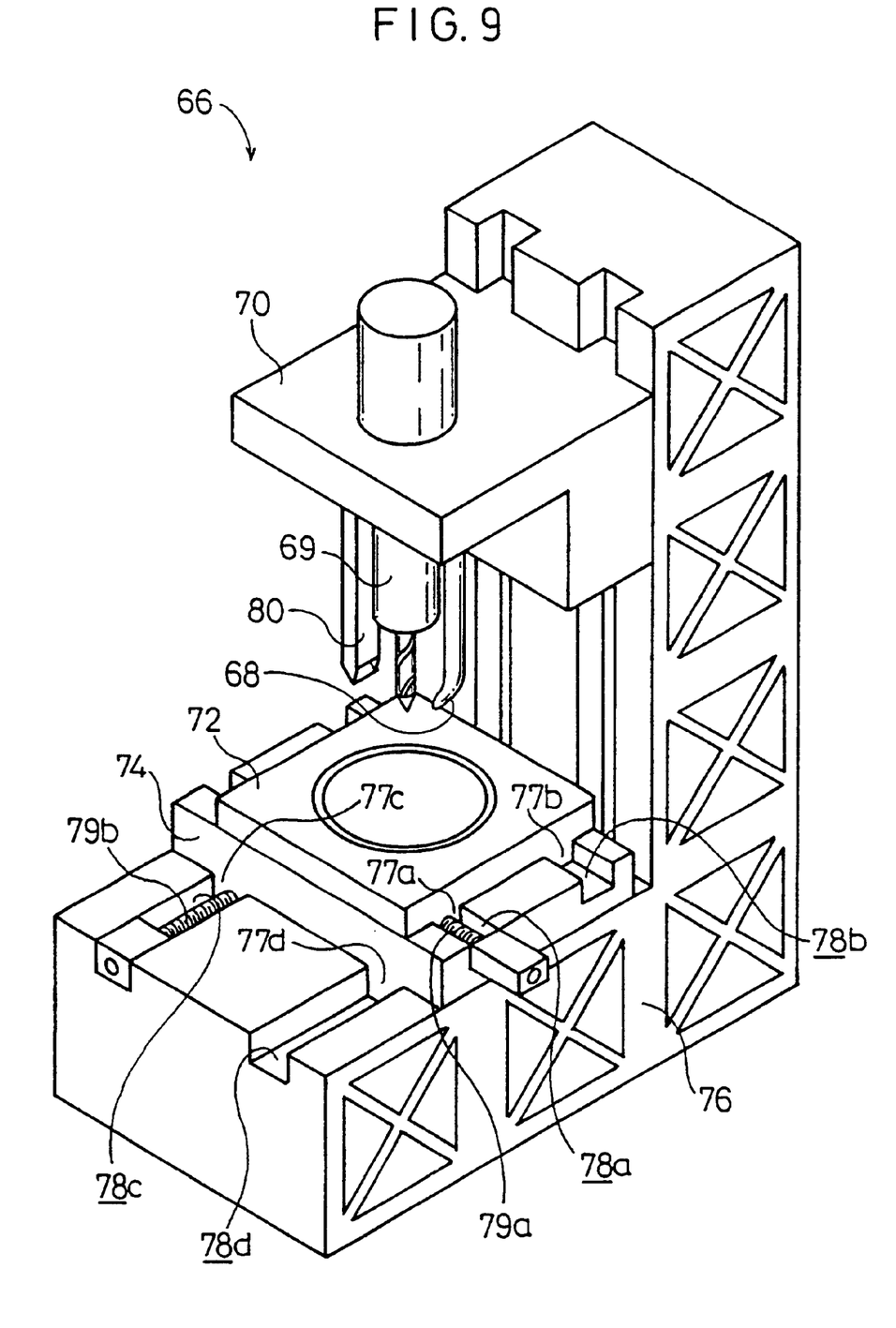
FIG. 9 shows a schematic perspective view illustrating a grinding center for grinding and machining the internal surface of the feed screw according to the present invention.

Further, as shown in FIG. 9, it is also preferable that the inner surface of the member made of aluminum or aluminum alloy is ground with a grinding center 66 which makes a spiral action. In this process, in place of cutting oil, it is preferable that high pressure air or high pressure gas is sprayed from a spraying section 68.

The grinding center 66 comprises a grinding tool 69, an elevator member 70, a turn table 72, a bed 74, and a frame 76. The respective members except for the grinding tool 69 are made of aluminum or aluminum alloy.

The grinding tool 69 is fixedly secured to the elevator member 70. The elevator member 70 is provided displaceably in upward and downward directions along an upstanding member of the frame 76. The turn table 72, on which the feed screw as a workpiece (not shown) is placed, is placed on the bed 74. Two stripes of projections 77a, 77b, which are formed at lower portions of the turn table 72, are fitted to two stripes of grooves 78a, 78b which are formed at upper portions of the bed 74 to construct a guide mechanism. Accordingly, the turn table 72 is freely movable in the groove direction. When the grinding center 66 is used, the turn table 72 is fixed at an arbitrary position by the aid of screws 79a.

On the other hand, two stripes of projections 77c, 77d, which are formed at lower portions of the bed 74, are fitted to two stripes of grooves 78c, 78d which are formed at upper portions of the frame 76 to construct a guide mechanism. Accordingly, the turn table 72 is freely movable in the groove direction by the aid of the turn table 72. When the grinding center 66 is used, the turn table 72 is fixed at an arbitrary position by the aid of screws 79b.

In FIG. 9, reference numeral 80 indicates a drawing mechanism connected to a negative pressure source for drawing and discharging grinding chips generated during the grinding. It is desirable that the grinding center 66 can perform both of grinding and cutting. Further, it is preferable that the feed screw as the workpiece can be automatically exchanged, or the grinding center 66 has a pallet or a parts feed means.

The feed screw, which is formed with aluminum or aluminum alloy in accordance with the method described above, is surface-treated for its surface, and it is preferably subjected to the surface finish treatment. Accordingly, the frictional resistance is remarkably decreased, and the abrasion of the respective members is reduced more preferably. Further, the surface characteristics such as the hardness are improved.

The surface finish treatment method may be exemplified by a nickel plating treatment, an aluminum anodic oxidation treatment, and a magnesium anodic oxidation treatment. The surface treatment layer of the member, to which the surface treatment as described above has been applied, may be improved in quality, for example, by means of a thermal hardening treatment. Alternatively, it is also preferable to perform various finish treatments including, for example, the shot peening, a buff finish treatment, a lapping finish treatment, a liquid honing finish treatment, a burnishing finish treatment, a roller finish treatment, a chemical polishing treatment, an electropolishing treatment, and a sandblast finish treatment.

When the feed screw is a ball screw, it is preferable to use, as balls for the ball screw, for example, balls composed of aluminum alloy of the aluminum alloy number 7000 or those having numbers similar thereto based on the JIS standard. In this arrangement, it is preferable that the surfaces of the aluminum balls are surface-treated by means of the shot peening treatment to form, for example, inclined surfaces or oil reservoirs having the elastohydrodynamic lubrication effect. Further, it is also preferable that the surface of the ball screw or the sliding screw as the feed screw is surface-treated by means of the shot peening treatment to form, for example, inclined surfaces or oil reservoirs having the elastohydrodynamic lubrication effect.

The shot peening treatment may be performed a plurality of times under different shot peening conditions for the surfaces of the aluminum balls so that the residual stress and the impurities on the surface are removed, and the metal, which is the material for the shot peening particles, may permeate into the surface.

The rolling method as the production method according to the present invention, the cutting method such as the precision cutting method based on the use of the diamond tip or the like, the formation method such as the cutting method based on the use of the general-purpose cutting tool, the various surface treatments such as the plating treatment, and the respective methods including, for example, the surface finish treatment such as the super finishing treatment can be also used for the respective members and the apparatuses described above other than the feed screw.

In the embodiments described above, explanation has been made, in which the feed screw according to the present invention is applied to the driving force-transmitting means of the actuator. However, there is no limitation thereto. The feed screw is also applicable as a feed screw, for example, for a general machine tool or a robot apparatus.

According to the feed screw concerning the present invention, the driving force-transmitting shaft is made of aluminum or aluminum alloy, and the bearing member is made of any one of synthetic resin, aluminum, and aluminum alloy. Therefore, the abrasion of the respective members and the sliding resistance at the sliding portions are decreased, and the frictional resistance is reduced. The weight of the driving force-transmitting shaft is reduced, and hence it is easy to perform the operation for attaching the apparatus equipped with the feed screw. Further, the input torque is increased, for example, owing to the fact that the driving force-transmitting shaft scarcely has a lengthy size, and the load inertia is large, and thus it is possible to realize the compact size of the motor as the driving source. Furthermore, it is possible to suppress the influence exerted on the magnetic field. Therefore, there is no limitation for the attachment place.

The abrasion of the respective members and the frictional resistance at the sliding portions can be further reduced by applying the surface treatment such as the plating treatment, the anodic oxidation treatment, and the shot peening treatment to the surface of the member formed with aluminum or aluminum alloy.

Additionally, the abrasion of the respective members and the frictional resistance at the sliding portions can be further reduced by applying the surface finish treatment such as the super finishing treatment to the respective members such as the driving force-transmitting shaft having been subjected to the surface treatment.

According to the method for producing the feed screw concerning the present invention, at least one of the driving force-transmitting shaft or the bearing member is manufactured by means of the rolling method or the precision cutting method by using aluminum or aluminum alloy. Therefore, the member of the feed screw can be efficiently produced at a high degree of machining accuracy.

What is claimed is:

1. A feed screw system, comprising a driving force-transmitting shaft and a bearing member externally fitted to said driving force-transmitting shaft, wherein:
    said driving force-transmitting shaft is made of aluminum or aluminum alloy, and said bearing member is made of any one of a synthetic resin, aluminum or aluminum alloy, and
    a surface of at least any one of said driving force transmitting shaft and said bearing member is surface-treated by means of an aluminum anodic oxidation treatment or a magnesium anodic oxidation treatment.

2. A feed screw system comprising a driving force-transmitting shaft and a bearing member externally fitted to said driving force-transmitting shaft, wherein:
    said driving force-transmitting shaft is made of aluminum or aluminum alloy, and said bearing member is made of any one of a synthetic resin, aluminum or aluminum alloy, and
    a surface of at least any one of said driving force transmitting shaft and said bearing member is surface-treated by means of a shot peening treatment applied a plurality of times by alternately using two types of particles having different particle sizes.

3. A feed screw, comprising:
    a driving force-transmitting shaft and a bearing member externally fitted to said driving force-transmitting shaft;
    said driving force-transmitting shaft made of aluminum or aluminum alloy;
    said bearing member made of any one of a synthetic resin, aluminum or aluminum alloy; and
    a nickel coating film formed on a surface of at least any one of said driving force-transmitting shaft and said bearing member by means of a plating treatment, said nickel coating film having a surface subjected to a surface finish treatment by means of a shot peening treatment.

4. A feed screw, comprising:
    a driving force-transmitting shaft and a bearing member externally fitted to said driving force-transmitting shaft;
    said driving force-transmitting shaft made of aluminum or aluminum alloy;
    said bearing member made of any one of a synthetic resin, aluminum or aluminum alloy; and
    a nickel coating film formed on a surface of at least any one of said driving force-transmitting shaft and said bearing member by means of a plating treatment, said nickel coating film having a surface subjected to a surface finish treatment by means of at least one method selected from the group consisting of a super finishing treatment, a buff finish treatment, a lapping finish treatment, a liquid honing finish treatment, a burnishing finish treatment, a roller finish treatment, a chemical polishing finish treatment, an electropolishing finish treatment, a sandblast finish treatment, a grinding finish treatment with a diamond grinding wheel or a boron nitride grinding wheel, a grinding finish treatment with a diamond grinding wheel or a boron nitride grinding wheel equipped with a dressing mechanism, and a cutting finish treatment with a diamond electrodeposition top or a broach tap.

5. The feed screw according to claim 1, wherein said surface of at least any one of said driving force-transmitting shaft and said bearing member, which is applied with said aluminum anodic oxidation treatment or said magnesium anodic oxidation treatment, is subjected to a surface finish treatment by means of a shot peening treatment.

6. The feed screw according to claim 1, wherein said surface of at least any one of said driving force-transmitting shaft and said bearing member, which is applied with said aluminum anodic oxidation treatment or said magnesium anodic oxidation treatment, is subjected to a surface finish treatment by means of at least one method selected from the group consisting of a super finishing treatment, a buff finish treatment, a lapping finish treatment, a liquid honing finish treatment, a burnishing finish treatment, a roller finish treatment, a chemical polishing finish treatment, an electropolishing finish treatment, a sandblast finish treatment, a grinding finish treatment with a diamond grinding wheel or a boron nitride grinding wheel, a grinding finish treatment with a diamond grinding wheel or a boron nitride grinding wheel equipped with a dressing mechanism, and a cutting finish treatment with a diamond electrodeposition tap or a broach tap.

7. The feed screw according to claim 2, wherein:
    said shot peening treatment based on the use of said two types of particles having said different particle sizes is a treatment in which particles having a large particle size are firstly shot, and then particles having a small particle size are shot at said surface of at least any one of said driving force-transmitting shaft and said bearing member; and
    said surface is hardened by being shot with said particles having said large particle size, and fine irregularities are formed by being shot with said particles with said small particle size.

8. The feed screw according to claim 3, wherein said surface of at least any one of said driving force-transmitting shaft and said bearing member, which is applied with said shot peening treatment, is further subjected to a surface finish treatment by means of at least one method selected from the group consisting of a super finishing treatment, a buff finish treatment, a lapping finish treatment, a liquid honing finish treatment, a burnishing finish treatment, a roller finish treatment, a chemical polishing finish treatment, an electropolishing finish treatment, a sandblast finish treatment, a grinding finish treatment with a diamond grinding wheel or a boron nitride grinding wheel, a grinding finish treatment with a diamond grinding wheel or a boron nitride grinding wheel equipped with a dressing mechanism, and a cutting finish treatment with a diamond electrodeposition tap or a broach tap.

9. The feed screw according to claim 5, wherein said surface of at least any one of said driving force-transmitting shaft and said bearing member, which is applied with said shot peening treatment, is further subjected to a surface finish treatment by means of at least one method selected from the group consisting of a super finishing treatment, a buff finish treatment, a lapping finish treatment, a liquid honing finish treatment, a burnishing finish treatment, a roller finish treatment, a chemical polishing finish treatment, an electropolishing finish treatment, a sandblast finish treatment, a grinding finish treatment with a diamond grinding wheel or a boron nitride grinding wheel, a grinding finish treatment with a diamond grinding wheel or a boron nitride grinding wheel equipped with a dressing mechanism, and a cutting finish treatment with a diamond electrodeposition tap or a broach tap.

10. The feed screw according to claim 7, wherein said surface of at least any one of said driving force-transmitting shaft and said bearing member, which is applied with said shot peening treatment, is subjected to a surface finish treatment by means of at least one method selected from the group consisting of a super finishing treatment, a buff finish treatment, a lapping finish treatment, a liquid honing finish treatment, a burnishing finish treatment, a roller finish treatment, a chemical polishing finish treatment, an electropolishing finish treatment, a sandblast finish treatment, a grinding finish treatment with a diamond grinding wheel or a boron nitride grinding wheel, a grinding finish treatment with a diamond grinding wheel or a boron nitride grinding wheel equipped with a dressing mechanism, and a cutting finish treatment with a diamond electrodeposition tap or a broach tap.

11. The feed screw according to any one of claims 1 through 4, wherein said driving force-transmitting shaft comprises a ball screw, and said ball screw is applied to an actuator by being coupled to a driving shaft of a rotary driving source to transmit rotary driving force of said rotary driving source to a movable member so that said movable member is provided displaceably in a longitudinal direction of a frame.

12. The feed screw according to any one of claims 1 through 4, wherein said driving force-transmitting shaft comprises a sliding screw, and said sliding screw is applied to an actuator by being coupled to a driving shaft of a rotary driving source to transmit rotary driving force of said rotary driving source to a movable member so that said movable member is provided displaceably in a longitudinal direction of a frame.

13. The feed screw according to claim 11, wherein surfaces of said ball screw and a plurality of balls engaged with said ball screw are surface-treated by means of a shot peening treatment.

14. The feed screw according to claim 11, wherein a surface of said sliding screw is surface-treated by means of a shot peening treatment.

15. The feed screw according to any one of claims 1 through 4, wherein at least one of said driving force-transmitting shaft and said bearing member comprises a rolled aluminum or aluminum alloy manufactured using a rolling method.

16. The feed screw according to any one of claims 1 through 4, wherein at least one of said driving force-transmitting shaft and said bearing member comprises a precision cut aluminum or aluminum alloy manufactured using any one selected from the group consisting of a diamond tip, a boron nitride tip, and an electrodeposition tool made of diamond, a sintering tool made of diamond, and an electrodeposition tool made of boron nitride, and a sintering tool made of boron nitride.

\* \* \* \* \*